United States Patent
Bumann et al.

(12) 
(10) Patent No.: US 6,872,798 B2
(45) Date of Patent: Mar. 29, 2005

(54) POLYCARBONATE COMPOSITE MATERIAL WHICH CAN BE THERMOPLASTICALLY SHAPED, METHODS FOR THE PRODUCTION THEREOF, USE OF THE SAME AND A FLAME-PROOF POLYCARBONATE MOULDED PART

(75) Inventors: Detlef Bumann, Alsbach-Hähnlein (DE); Andreas Fetzer, Bickenbach (DE); Michael Meier-Kaiser, Alsbach-Hähnlein (DE)

(73) Assignee: Roehm GmbH & Co., KG, Darmstadt (DE)

( * ) Notice: Subject to any disclaimer, the term of this patent is extended or adjusted under 35 U.S.C. 154(b) by 13 days.

(21) Appl. No.: 10/432,261

(22) PCT Filed: Nov. 2, 2001

(86) PCT No.: PCT/EP01/12680

§ 371 (c)(1),
(2), (4) Date: Nov. 5, 2003

(87) PCT Pub. No.: WO02/42072

PCT Pub. Date: May 30, 2002

(65) Prior Publication Data

US 2004/0062933 A1 Apr. 1, 2004

(30) Foreign Application Priority Data

Nov. 22, 2000 (DE) .......................................... 100 58 150

(51) Int. Cl.⁷ .............................................. C08G 64/00

(52) U.S. Cl. .................... 528/196; 264/176.1; 264/219; 428/411.1; 428/412; 428/423.5; 428/423.7; 359/109; 369/59.2; 369/272; 528/198

(58) Field of Search .............................. 264/176.1, 219; 428/411.1, 412, 423.5, 423.7; 359/109; 369/59.2, 272; 528/196, 198

(56) References Cited

U.S. PATENT DOCUMENTS

| 3,928,708 | A | | 12/1975 | Fohlen et al. | |
|---|---|---|---|---|---|
| 5,024,877 | A | | 6/1991 | McCullough, Jr. et al. | |
| 2002/0160177 | A1 | * | 10/2002 | Warth et al. ............. | 428/318.4 |

FOREIGN PATENT DOCUMENTS

| DE | 44 43 164 | 6/1996 |
|---|---|---|
| EP | 0 510 927 | 10/1992 |
| JP | 59 228887 | 12/1984 |
| WO | 94 02533 | 2/1994 |

* cited by examiner

Primary Examiner—Terressa Boykin
(74) Attorney, Agent, or Firm—Oblon, Spivak, McClelland, Maier & Neustadt, P.C.

(57) ABSTRACT

The invention relates to a polycarbonate composite material which can be thermoplastically shaped and which comprises at least two layers. The invention is characterised in that at least one layer comprises an LOI value of lower than 29 and at least one layer comprises an LOI value of higher than 29. The invention also relates to methods for producing said material, the use of the same and flame-proof polycarbonate moulded parts.

20 Claims, 1 Drawing Sheet

Fig. 1

Fig. 2

POLYCARBONATE COMPOSITE MATERIAL WHICH CAN BE THERMOPLASTICALLY SHAPED, METHODS FOR THE PRODUCTION THEREOF, USE OF THE SAME AND A FLAME-PROOF POLYCARBONATE MOULDED PART

The present invention relates to thermoplastically moldable composite polycarbonate materials, processes for their production, use of the materials, and flame-retardant polycarbonate moldings. The invention relates in particular to thermoplastically moldable composite polycarbonate materials which can be used to produce flame-retardant polycarbonate moldings with an attractive and functional surface effect.

Polycarbonate moldings have been known for a long time. They are widely used in the sectors of electrical engineering and electronics (production of plugs, plug connectors, switches, component housings, printed circuit boards, distribution boxes, etc.), data processing (optical data-storage disks), lighting (lamp covers, lamp housings, illuminated placards, optical waveguide systems), optics (optical lenses, which can be rendered scratch-resistant via coatings), household technology (housings for kitchen machines, fans, vacuum cleaners; microwave-resistant tableware, etc.), the leisure industry (safety helmets, fracture-proof protective goggles), the construction industry (translucent roofing, soundproof barriers), and vehicle construction [interior trim for buses, railroad cars and aircraft, dashboards, lamp covers, shock absorbers (made from polycarbonate blends, e.g. with ABS), and bodywork parts] (CD Römpp Chemie Lexikon [Römpp Chemical Encyclopedia]—Version 1.0, Stuttgart/New York: Georg Thieme Verlag 1995).

The self-extinguishing property of polycarbonates is not adequate in many application sectors. For example, for applications in aircraft construction polycarbonates have to meet particularly stringent fire protection regulations, to comply with which they have hitherto required the addition of flame retardants and/or flame-retarding additives. Due to the presence of the flame retardants and/or the flame-retarding additives, these polycarbonate moldings become non-transparent, and generally acquire a slight to marked unintended color.

The consumer demands that the visible side of polycarbonate moldings be attractive. In the case of flame-retarding grades, this is currently achieved by means of opaque coloration and, where appropriate, structuring of the surface.

The colors produced here are preferably plain colors, for reasons associated with extrusion technology. Some of the surfaces of the moldings are decorated by using specific, flame-retarding lacquers. A disadvantage of this procedure is that these lacquering processes are very complicated, and that it is impossible to achieve many of the desired surface effects and functional surface effects. Furthermore, the decorative finishes applied have inadequate protection from mechanical effects.

In the light of the prior art, it was then an object of the present invention to provide a thermoplastically moldable composite polycarbonate material which permits the production of flame-retardant polycarbonate moldings with an attractive and functional surface effect, where these moldings are not restricted to plain colors. In particular, it should be possible to produce flame-retardant polycarbonate moldings not hitherto disclosed, with functional surface effects. Another object consists in providing a thermoplastically moldable composite polycarbonate material which satisfies current fire protection regulations, in particular those of the aircraft industry. The thermoplastically moldable composite polycarbonate material should be capable of simple, low-cost production.

Another object on which the present invention was based was to provide a process which can be carried out at low cost and is capable of large-scale application, to produce the thermoplastically moldable composite polycarbonate material of the invention.

In addition, the process should be easy and simple to carry out using commercially available components. Another object of the invention was to provide a polycarbonate molding with attractive and functional surface effects. This surface effect should have protection from external effects, such as environmental effects and mechanical effects. Possible uses of the polycarbonate molding of the invention should also be given.

These objects are achieved, as are other objects not explicitly mentioned but readily derivable or deducible from the circumstances described in the introduction to this specification, by means of a thermoplastically moldable composite polycarbonate material with all of the features of claim 1. Useful modifications of the thermoplastically moldable composite polycarbonate material of the invention are protected by the subclaims dependent on claim 1. Processes for producing the thermoplastically moldable composite polycarbonate material of the invention are described in the process claims. In addition, a flame-retardant polycarbonate molding is claimed, obtainable from the thermoplastically moldable polycarbonate molding via thermoplastic molding. The use claim protects a preferred use of the flame-retardant polycarbonate molding of the invention.

The provision of a thermoplastically moldable composite polycarbonate material with at least two layers, where the material has at least one layer with an LOI value smaller than 29 and at least one layer with an LOI value greater than 29, is a successful and not readily foreseeable method of obtaining a thermoplastically moldable composite polycarbonate material with an attractive and functional surface effect. It enables simple production of a polycarbonate molding with an attractive and functional surface effect, on a large scale and at low cost. Surface effects which are novel and have not previously been disclosed can be achieved here.

The fact that thermoplastic molding can be used to obtain a flame-retardant polycarbonate molding from a thermoplastically moldable composite polycarbonate material with at least two layers, where the material has at least one layer with an LOI value smaller than 29 and at least one layer with an LOI value greater than 29 is particularly surprising because polycarbonates with an LOI value smaller than 29 do not comply with the usual fire-protection regulations, in particular in the aircraft construction sector. At the same time, other advantages are achievable via the process of the invention. They include:

There is no need to lacquer the surfaces of the thermoplastically moldable composite material of the invention and of the molding which can be produced therefrom.

The surface effect of the invention of the thermoplastically moldable composite material of the invention and of the molding which can be produced therefrom has protection from mechanical effects.

The present invention provides thermoplastically moldable polycarbonates. Polycarbonates are plastics known to the skilled worker. They represent thermoplastic polymers having the general structural formula and can be formally regarded as polyesters made from carbonic acid and from an aliphatic or aromatic dihydroxy compound. The radical R here represents bivalent aliphatic, cycloaliphatic, or aromatic groups which derive from the corresponding dihydroxy compounds.

Polycarbonates which may be used according to the invention include homopolycarbonates, copolycarbonates, unbranched polycarbonates, branched polycarbonates, and mixtures of the polycarbonates mentioned.

For the purposes of the present invention, preference is given to aromatic radicals R. These include radicals which derive from hydroquinone, from resorcinol, from 4,4'-dihydroxydiphenol, from 2,2-bis(4-hydroxyphenyl)propane, from 2,4-bis(4-hydroxyphenyl)-2-methylbutane, 2,2-bis(4-hydroxy-3,5-dimethylphenyl)propane, from 2,2-bis(4-hydroxy-3,5-dichlorophenyl)propane, from 2,2-bis(4-hydroxy-3,5-dibromophenyl)propane, or from 1,1-bis(4-hydroxyphenyl)cyclohexane, or from 1,1-bis(4-hydroxyphenyl)-3,3,5-trimethylcyclohexane. Particularly preferred radicals R are derived from 2,2-bis(4-hydroxyphenyl)propane or from 1,1-bis(4-hydroxyphenyl) cyclohexane.

Where appropriate, the radicals R may bear other substituents, preferably methyl groups or halogen groups. Particularly preferred substituents are bromine atoms and chlorine atoms.

The polycarbonates of the invention preferably have a weight-average molar mass in the range from 10 000 g/mol to 200 000 g/mol. Particular preference is given to a weight-average molar mass in the range from 10 000 g/mol to 100 000 g/mol, in particular from 15 000 g/mol to 45 000 g/mol.

The polycarbonates of the invention may comprise other polymers miscible with polycarbonate. These include poly (meth)acrylates, polyesters, polyamides, polyimides, polyurethanes, polyethers, ABS, ASA, and PBT.

For the purposes of the present invention, miscibility of the various substances means that the components form a homogeneous mixture.

The polycarbonates may moreover comprise additives well known in the technical field. These include antistats, antioxidants, dyes, fillers, light stabilizers, pigments, UV absorbers, agents providing weathering protection, and plasticizers.

According to the present invention, the thermoplastically moldable composite polycarbonate material has at least two layers which differ in their LOI value. The term "layer" is well known to the skilled worker. For the purposes of the present invention, layers represent regions of homogeneous LOI value, delineated from one another and from the surroundings by sharp boundaries. For the purposes of the present invention, the shape of the layers is as desired. The layer shapes preferred according to the invention are obtainable by means of extrusion.

According to the invention, at least one layer of the thermoplastically moldable composite polycarbonate material has an LOI value smaller than 29 and at least one layer has an LOI value greater than 29. The LOI value is an abbreviation known to the skilled worker for what is called the oxygen index (being derived from the term "limiting oxygen index"), and this value states the limiting value for oxygen usage in an oxygen/nitrogen mixture at which the material just continues to burn independently after ignition by an external flame. It is usually determined using the ASTM D 2863 test method. Straight polycarbonate in which no flame retardant or flame-retarding additives are present usually has an LOI value of 26. The LOI value can be increased to 32–35 by adding flame retardants and/or flame-retarding additives (Bodo Carlowitz *Kunststofftabellen* [Plastics tables] 4th edition; Munich, Vienna; Hanser 1995 p. 146).

Flame retardants and/or flame-retarding additives are known to the skilled worker. They represent those inorganic and/or organic substances which are intended to provide flameproofing (flame retardancy) in particular to wood and wood-based materials, plastics, and textiles. They achieve this by inhibiting the spread of flame to the substances to be protected, impeding ignition, and making combustion more difficult. Flame retardants and/or flame-retarding additives encompass, inter alia, substances whose action comprises suffocating the fire, promoting carbonization, and forming a barrier layer and/or an insulating layer. They include specific inorganic compounds, such as aluminum oxide hydrates, aluminum hydroxides, water glass, borates, in particular zinc borates, antimony oxide (mostly together with organic halogen compounds), ammonium phosphates, such as $(NH_4)_2HPO_4$, and ammonium polyphosphates.

Other flame-retarding additives or flame retardants which may be used according to the invention encompass halogenated organic compounds, such as chloroparaffins, hexabromobenzene, brominated diphenyl ethers, and other bromine compounds, organophosphorus compounds, especially phosphates, phosphites, and phosphonates, in particular those with plasticizer action, such as triscresyl phosphate, and halogenated organophosphorus compounds, such as tris(2,3-dibromopropyl) phosphate or tris(2-bromo-4-methylphenyl) phosphate.

The flame-retarding additives and/or flame retardants which may be used according to the invention moreover also include those substances which expand in the manner of a foam on heating, carbonize at from 250° C. to 300° C., and in the process become solid and form a fine-pored cushion providing good insulation; examples being mixtures of urea, dicyandiamide, melamine, and organic phosphates.

The flame retardants and/or flame-retarding additives may be added to the polycarbonate before its preparation is complete. It is also possible to incorporate flame-retarding compounds in the form of monomers into the polycarbonate macromolecules.

Preference is given to those flame retardants and/or flame-retarding additives which in the event of fire do not form any environmentally hazardous substances, such as toxic phosphates and high-toxicity dioxins.

In one preferred embodiment of the present invention, the at least one layer with an LOI value smaller than 29 has an LOI value smaller than 28, preferably smaller than 27.

In another preferred embodiment of the present invention, the at least one layer with an LOI value greater than 29 has an LOI value greater than 30, preferably greater than 31.

For the purposes of the present invention, the at least one layer with an LOI value greater than 29 is preferably obtainable from a mixture composed of
  a) from 40 to 100% by weight, based on the total weight of the mixture, of at least one polycarbonate
  b) from 0 to 40% by weight, based on the total weight of the mixture, of at least one polymer from the group consisting of poly(meth)acrylates, polyesters, polyamides, polyimides, polyurethanes, polyethers, ABS, ASA, and PBT
  c) from 0 to 10% by weight, based on the total weight of the mixture, of at least one flame retardant and/or flame-retarding additive d) from 0 to 10% by weight, based on the total weight of the mixture, of at least one additive from the group consisting of antistats, antioxidants, dyes, fillers, light stabilizers, pigments, UV absorbers, agents providing weathering protection, and plasticizers, where the entirety of a), b), c), and d) gives 100% by weight.

It is also preferable that the at least one layer with an LOI value smaller than 29 is obtainable from a mixture composed of e) from 40 to 100% by weight, based on the total weight of the mixture, of at least one polycarbonate f) from 0 to 40% by weight, based on the total weight of the mixture, of at least one polymer from the group consisting of poly(meth)acrylates, polyesters, polyamides, polyimides, polyurethanes, polyethers, ABS, ASA, and PBT g) from 0 to 10% by weight, based on the total weight of the mixture, of at least one additive from the group consisting of antistats, antioxidants, dyes, fillers, light stabilizers, pigments, UV absorbers, agents providing weathering protection, and plasticizers, where the entirety of e), f), and g) gives 100% by weight.

The number of layers in the thermoplastically moldable composite polycarbonate material of the invention depends on the desired field of application. The thermoplastically moldable composite polycarbonate material of the invention here is composed of at least 2 layers, preferably of 2, 3, 4, or 5 layers.

Certain properties of the thermoplastically moldable composite polycarbonate material of the invention, in particular its combustibility, may be influenced via the ratio of the thickness of the at least one layer with an LOI value smaller than 29 and the thickness of the at least one layer with an LOI value greater than 29. This ratio is preferably in the range from 0.01 to 0.5.

The ratio of the weight of the at least one layer with an LOI value smaller than 29 and the weight of the at least one layer with an LOI value greater than 29 can also influence some of the properties of the thermoplastically moldable composite polycarbonate material of the invention, in particular its combustibility. This ratio is preferably likewise in the range from 0.01 to 0.5.

In one preferred embodiment of the present invention, the at least one polycarbonate layer with an LOI value smaller than 29 has a thickness of from 30 $\mu$m to 500 $\mu$m. For the purposes of the present invention, it is also preferable for the at least one polycarbonate layer with an LOI value greater than 29 to have a thickness of from 0.7 mm to 3 mm.

For the purposes of the present invention, preference is given to a thermoplastically moldable composite polycarbonate material in which a polycarbonate layer with an LOI value smaller than 29 is an outer layer of the composite polycarbonate material.

In one particularly preferred embodiment of the present invention, the thermoplastically moldable composite polycarbonate material has, between a layer with an LOI value greater than 29 and a layer with an LOI value smaller than 29, a third layer, the third layer being a decorative layer.

The skilled worker will clearly see that the thermoplastically moldable composite polycarbonate material of the invention may also have further layers. For example, it may have further polycarbonate layers whose composition differs from that of the abovementioned layers. It may have further decorative layers or print layers. The thermoplastically moldable composite polycarbonate material may moreover also comprise adhesive layers which may serve either to bond layers made from various plastics or else to secure the films onto the articles to be protected. There may also be variation in the layer sequence.

The thermoplastically moldable composite polycarbonate material of the invention meets the most stringent fire-protection requirements, in particular those from the aircraft construction sector. The requirements of the American authorities have binding effect worldwide on the air travel industry sector (FAR, Part 25, Amdt. 25–72, App. F, Part I (b) (4), Vertical Test; App. F., Part I (b) (5), Horizontal Test). Depending on the application sector, for example wall sheeting and ceiling sheeting, cables, and lines, the requirement is to demonstrate limited spread of fire and limited afterflame time for the test specimen, and in some cases the absence of combustion of drippings. In this context, FAR (FAR 25.853 (a) (1) (i), (ii), (iv), or (v)) requires that a flame be applied horizontally from the side or vertically from beneath to an elongate specimen (in the shape of a strip; 305 mm×75 mm). According to the invention, preference is given to the vertical flame application test.

In order to meet current requirements, when a flame is applied to the edge of the test specimen for 60 and 12 seconds, respectively, the afterflame time must not exceed 15 seconds and the burn length must not be more than 150 and 200 mm, respectively, and the flame time of drippings must be smaller than 3 and 5 seconds, respectively, In one preferred embodiment of the present invention, on vertical flame-application to an edge for 60 seconds in accordance with FAR 25.853 (a) (1) (i) the thermoplastically moldable composite polycarbonate material of the present invention has a burn length smaller than 150 mm, preferably smaller than 120 mm, and the afterflame time is shorter than 15 seconds, preferably shorter than 9 seconds, and the flame time of drippings is smaller than 3 seconds, preferably smaller than 2 seconds.

For the purposes of the present invention, preference is also given to thermoplastically moldable composite polycarbonate materials which, on vertical flame-application to an edge for 12 seconds in accordance with FAR 25.853 (a) (1) (ii), have a burn length smaller than 200 mm, preferably smaller than 50 mm, where the afterflame time is shorter than 15 seconds, preferably shorter than 7 seconds, and the flame time of drippings does not exceed 5 seconds, preferably does not exceed 1 second.

The FAR and Airbus-Industrie require that materials for the interior fitting of aircraft also comply with certain limiting NBS-chamber smoke density values (FAR 25.853 (c); AITM 2.0007) (FAR, Part 25, Amdt. 25–72, App. F, Part V: Test Method to determine the Smoke Emission Characteristics of Cabin Materials) (Airbus Industrie Technical Specification ATS-1000.001, Issue 5; Airbus Directives ABD0031). In this test, a square test specimen (74 mm±1 mm×74 mm±1 mm) arranged vertically in the NBS chamber is irradiated by an electrical source of radiated heat with I=25 kW/m$^2$, and thus pyrolytically decomposed. A photometer system is used to measure the attenuation of a light beam due to smoke particles released, as a function of time. The test is carried out for 6 minutes under smoldering conditions (without ignition flame) or with ignition flame. The specific optical density to be calculated must not be above $Ds_{max}$=200 during a test period of four minutes.

In one preferred embodiment of the present invention, a feature of the thermoplastically moldable composite polycarbonate material is that the specific optical density in accordance with FAR 25.858 (c) and AITM 2.0007 does not exceed $Ds_{max}$=200, preferably does not exceed $Ds_{max}$=140, during a test period of four minutes.

The toxicity of the fire gases is evaluated in accordance with the Airbus specification AITM 3.0005 (Airbus Industrie Technical Specification ATS-1000.001, Issue 5; Airbus Directives ABD0031) using analytically determined concentration values for various smoke components during the NBS chamber test. The current limiting values here according to ATS are 3 500 ppm for carbon monoxide CO, 100 ppm for sulfur dioxide $SO_2$, 150 ppm for hydrogen chloride HCl, 150 ppm for hydrogen cyanide HCN, 100 ppm for hydrogen fluoride, and 100 ppm for the nitrogen-containing gases nitrogen monoxide NO and nitrogen dioxide $NO_2$.

According to the invention, preference is given to thermoplastically moldable composite polycarbonate materials for which the fire gases during the NBS chamber test in accordance with AITM 3.0005 comprise not more than 3 500 ppm, preferably not more than 300 ppm, of carbon monoxide, not more than 100 ppm of sulfur dioxide, preferably no sulfur dioxide, not more than 100 ppm of hydrogen chloride, preferably no hydrogen chloride, not more than 150 ppm, preferably not more than 2 ppm, of hydrogen cyanide, not more than 100 ppm of hydrogen fluoride, preferably no hydrogen fluoride, and not more than 100 ppm, preferably not more than 3 ppm, of nitrogen monoxide and nitrogen dioxide.

Processes for producing the thermoplastically moldable composite polycarbonate material of the invention will be apparent to the skilled worker. For the purposes of the present invention, a preferred process is extrusion. This begins by using at least two dry polycarbonate mixes which, where appropriate, comprise other components, at least one dry mix with an LOI value greater than 29 and at least one dry mix with an LOI value smaller than 29.

For the purposes of the invention, dry mixing means that during the further course of the process there is no need to remove solvent from this mixture. Permissible solvent residues are those for which no further treatment is needed or which can be separated from the mixture by vacuum in the extruder. The dry mix preferably comprises less than 0.01% by weight of solvent, based on the total weight of the dry mix.

The mixing may take place in conventional apparatus well known for this purpose. The temperature at which the mixing takes place is below the gelling temperature of the respective mixture. This step is preferably carried out at room temperature.

Figure 1:
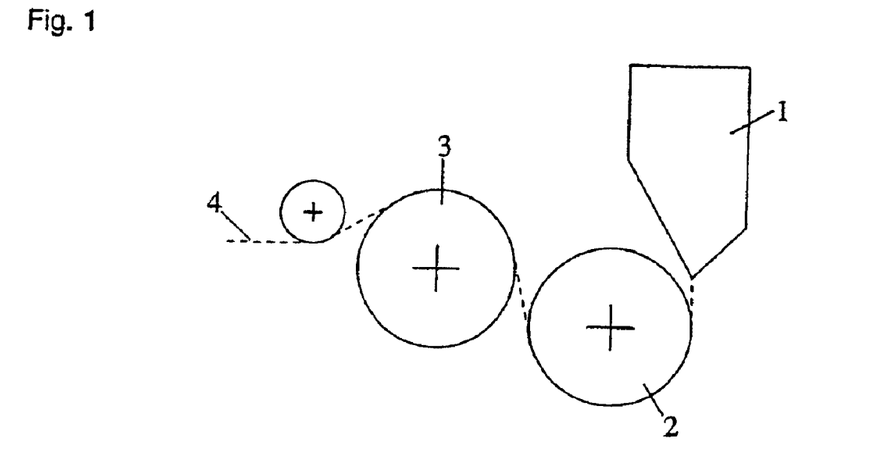
Figure 2:
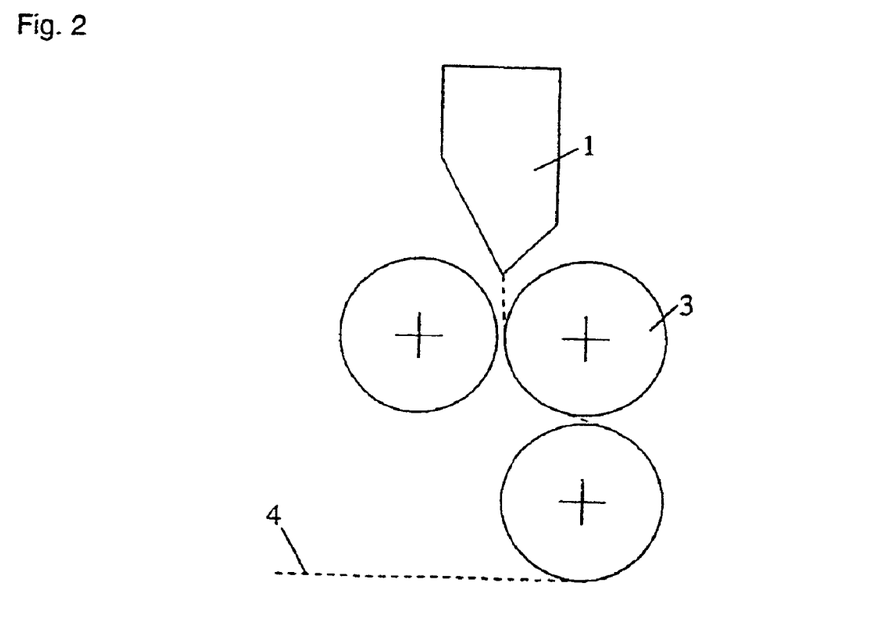

The dry mix with an LOI value smaller than 29 is separately extruded onto a polishing stack, the temperature of whose rollers is below 140° C., thus molding a film. The extrusion of polymers to give films or layers is well known, and is described by way of example in Kunststoffextrusionstechnik II [Plastics extrusion technology II], Hanser Verlag, 1986, pp. 125 et seq. Extrusion may take place by way of what is known as the "chill roll" method, of which FIG. 1 gives a diagram. The hot melt is passed from the die of the extruder 1 onto a chill roll 2, polished rollers being used to obtain high gloss. However, the process of the invention may also use rollers other than a chill roll. A further roller 3 then takes up the melt cooled on the roller 2, thus giving a single-layer film 4, which can be provided with further layers. As an alternative, the extrusion process may also take place in a polishing stack, as in the diagram of FIG. 2. Here, the hot melt is calendered between two or more rollers 3 to give continuous films 4.

In order that the film produced is substantially free from contamination, a filter is arranged upstream of entry of the melt into the die. The mesh width of the filter generally depends on the starting materials used, and may correspondingly vary over a wide range. However, it is generally in the range from 300 $\mu$m to 20 $\mu$m. Filters with two or more screens of different mesh widths may also be arranged upstream of the entry to the die. These filters are well known in the technical field and are commercially available. The examples attached can also serve as a further starting point for the skilled worker.

In order to obtain high-quality films it is moreover advantageous to use particularly pure raw materials.

The thickness of each film or layer may vary across a wide range which generally depends on the desired use. As mentioned above, the preferred thickness of at least one film or layer with an LOI value smaller than 29 is from 30 $\mu$m to 500 $\mu$m, and the preferred thickness of at least one film or layer with an LOI value greater than 29 is between 0.7 mm and 3 mm. The film thickness or layer thickness may be adjusted via parameters which are known to the skilled worker.

The pressure used to press the molten mixtures into the respective dies may be controlled, by way of example, via the screw speed. The pressure is generally in the range from 40 to 100 bar, but this is not intended to restrict the process of the invention. The examples attached will give the skilled worker further indications in relation to the general process parameters.

So that the resultant films or layers have high surface quality and low haze, it is important that the temperature selected for the die is higher than the temperature of the mixture upstream of entry to the die, but lower than the gelling temperature.

The die temperature is preferably set higher by 5%, particularly preferably by 10%, and very particularly preferably by 15%, than the temperature of the mixture upstream of entry to the die. Correspondingly, preferred die temperatures are in the range from 283° C. to 345° C., particularly preferably from 297° C. to 345° C., and very particularly preferably from 310° C. to 345° C.

The film to be laminated onto the material is produced separately, where appropriate printed, and then laminated to the base substrate in the polishing stack.

In one preferred embodiment of the present invention, the surface of at least one film or layer with an LOI value smaller than 29 is provided with an optical effect. The film provided with the optical effect and having an LOI value smaller than 29 is then laminated to a film or layer with an LOI value greater than 29 in such a way that the resultant thermoplastically moldable composite polycarbonate material has at least one decorative layer between a layer with an LOI value smaller than 29 and a layer with an LOI value greater than 29.

The application of these layers by co-lamination may take place at room temperature or at a slightly elevated temperature, avoiding any impairment of the surface quality and the haze of the layers. These processes are well known in the technical field and are described by way of example in Kunststoffextrusionstechnik II [Plastics extrusion technology II], Hanser Verlag, 1986, pp. 320 et seq.

For the purposes of the present invention, it is particularly advantageous that the abovementioned steps, i.e. the production of the polycarbonate-containing films or polycarbonate-containing layers, and, where appropriate, the printing and the lamination to other layers, generally be carried out in a continuous process.

The result is a sheet product from which polycarbonate moldings can be thermoformed. Thermoforming is a process known to the skilled worker for producing polymer moldings by molding the desired moldings from a thermoplastically moldable polymer above a certain temperature. "Molding" here encompasses all of the activities which alter the shape of the moldable polymer, examples being mono- and biaxial stretching, and also the manufacture of specific moldings. For the purposes of the present invention, the thermoplastically moldable composite material is preferably hot-molded at a temperature above 165° C.

Possible application sectors for the polycarbonate molding of the invention will be apparent to the skilled worker. It is particularly suitable for any of the applications for which single- or multilayer polycarbonate moldings are suitable. Their characteristic properties make them particularly suitable for applications in sectors which have to comply with stringent fire-protection requirements, in particular for applications in aircraft construction.

The examples below and the comparative example serve to illustrate the invention, but are not intended to result in any restriction.

COMPARATIVE EXAMPLE 1

A commercially available, flame-retardant, black-colored polycarbonate (e.g. MAKROLON®) with one smooth and one structured side was used. The thickness of the material was 2.0 mm. The polycarbonate had an LOI value of 32–35 to ASTM D 2863.

a) Flame Application Tests

In accordance with FAR 25.853 (a) (1), a flame was applied to an elongate specimen (strip; 305 mm×75 mm), horizontally from the side or vertically from below, for 60 or 12 seconds. The tests here were repeated 3 times. The results are given in tables 1 to 4, where they are compared with the current permitted limiting values.

TABLE 1

Flame application to comparative example 1;
60 s vertical; FAR 25.853 (a) (1) (i)

| Longitudinal | Burn length in [mm] | Afterflame time in [s] Specimen | Drippings |
|---|---|---|---|
| 1 | 75 | 2 | 0 |
| 2 | 80 | 0 | 0 |
| 3 | 70 | 0 | 0 |
| 4 | 75 | 1 | 0 |
| 5 | 70 | 7 | 6 |
| Average | 74 | 2 | 1 |
| Limiting value | 152 | 15 | 3 |

TABLE 2

Flame application to comparative example 1;
60 s horizontal; FAR 25.853 (a) (1) (iv)

| Transverse | Burn length in [mm] | Afterflame time in [s] Specimen | Drippings |
|---|---|---|---|
| 1 | 70 | 0 | 0 |
| 2 | 80 | 3 | 0 |
| 3 | 70 | 0 | 0 |
| 4 | 65 | 4 | 0 |
| 5 | 75 | 0 | 0 |
| Average | 72 | 1 | 0 |
| Limiting value | 152 | 15 | 3 |

TABLE 3

Flame application to comparative example 1;
12 s vertical; FAR 25.853 (a) (1) (ii)

| Longitudinal | Burn length in [mm] | Afterflame time in [s] Specimen | Drippings |
|---|---|---|---|
| 1 | 10 | 2 | 0 |
| 2 | 15 | 2 | 0 |
| 3 | 15 | 2 | 0 |
| 4 | 15 | 3 | 0 |
| 5 | 15 | 3 | 0 |
| Average | 14 | 2 | 0 |
| Limiting value | 203 | 15 | 5 |

TABLE 4

Flame application to comparative example 1;
12 s horizontal; FAR 25.853 (a) (1) (v)

| Transverse | Burn length in [mm] | Afterflame time in [s] Specimen | Drippings |
|---|---|---|---|
| 1 | 15 | 2 | 0 |
| 2 | 15 | 1 | 0 |
| 3 | 10 | 2 | 0 |
| 4 | 15 | 3 | 0 |
| 5 | 15 | 2 | 0 |
| Average | 14 | 2 | 0 |
| Limiting value | 152 | 15 | 3 | b) Smoke Density Measurements

In accordance with FAR 25.853 (c) and AITM 2.0007, a square test specimen (74 mm±1 mm×74 mm±1 mm), vertically arranged in a NBS chamber, was irradiated with an electric source of radiated heat with I=25 kW/m$^2$, and thus pyrolytically decomposed. A photometer system was used to measure the attenuation of a light beam due to smoke particles released, as a function of time. The test was carried out for 6 minutes under smoldering conditions with ignition flame. The values calculated for the specific optical density are given in table 5, and are compared with the current limiting value for thermoplastic moldings $Ds_{max}$=200 (during a test period of four minutes).

TABLE 5

Smoke density test with flame application to
comparative example 1; FAR 25.853 (c)

| Specimen | Optical density at time t in [min] | | | | | | Ds max within 4 min |
|---|---|---|---|---|---|---|---|
| | 1 | 1.5 | 2 | 3 | 4 | 5 | 6 | |
| 1 | 4 | 19 | 45 | 67 | 89 | 109 | 122 | 89 |
| 2 | 8 | 24 | 36 | 73 | 92 | 117 | 137 | 92 |
| 3 | 5 | 20 | 39 | 77 | 105 | 122 | 141 | 105 |
| 4 | 5 | 18 | 43 | 67 | 84 | 92 | 102 | 84 |
| Average | 6 | 20 | 41 | 71 | 93 | 110 | 126 | 93 |
| Limiting value to FAR 25.853 (c) | | | | | | | | 200 | c) Smoke Analysis

In accordance with AITM 3.0005, the smoke in the NBS chamber was analyzed using calorimetric analysis tubes. The results are given in table 6 and compared with the current ATS limiting values.

TABLE 6

Smoke analysis from comparative example 1; AITM 3.0005

| Gas component | Limiting value in [ppm] after 4 min | Detected in [ppm] after 4 min |
| --- | --- | --- |
| HCN | 150 | 0.0 |
| CO | 3 500 | 200 |
| $NO + NO_2$ | 100 | 0.5 |
| $SO_2 + H_2S$ | 100 | 0.0 |
| HF | 100 | ./. |
| HCl | 150 | ./. |

./. not determined

EXAMPLE 1

A commercially available, flame-retardant, gray-colored polycarbonate (e.g. MAKROLON®) with one smooth and one structured side was used (thickness of material: 1.2 mm), to the structured side of which a non-flame-retardant polycarbonate film (thickness: 80 μm) had been laminated. The flame-retardant polycarbonate had an LOI value of 32–35 to ASTM D 2863, and the non-flame-retardant polycarbonate had an LOI value of 26 to ASTM D 2863.

a) Flame application tests

Method as in comparative example 1, results in tables 7 to 10

TABLE 7

Flame application to example 1; 60 s vertical; FAR 25.853 (a) (1) (i)

| Longitudinal | Burn length in [mm] | Afterflame time in [s] Specimen | Drippings |
| --- | --- | --- | --- |
| 1 | 95 | 10 | 0 |
| 2 | 105 | 15 | 0 |
| 3 | 105 | 3 | 5 |
| 4 | 100 | 0 | 0 |
| 5 | 100 | 2 | 0 |
| Average | 101 | 6 | 1 |
| Limiting value | 152 | 15 | 3 |

TABLE 8

Flame application to example 1; 60 s horizontal; FAR 25.853 (a) (1) (iv)

| Transverse | Burn length in [mm] | Afterflame time in [s] Specimen | Drippings |
| --- | --- | --- | --- |
| 1 | 100 | 2 | 0 |
| 2 | 100 | 0 | 0 |
| 3 | 105 | 3 | 15 |
| 4 | 115 | 9 | 0 |
| 5 | 100 | 6 | 0 |
| Average | 104 | 4 | 3 |
| Limiting value | 152 | 15 | 3 |

TABLE 9

Flame application to example 1; 12 s vertical; FAR 25.853 (a) (1) (ii)

| Longitudinal | Burn length in [mm] | Afterflame time in [s] Specimen | Drippings |
| --- | --- | --- | --- |
| 1 | 15 | 1 | 0 |
| 2 | 15 | 2 | 0 |
| 3 | 20 | 1 | 0 |
| 4 | 15 | 3 | 0 |
| 5 | 20 | 2 | 0 |
| Average | 17 | 2 | 0 |
| Limiting value | 203 | 15 | 5 |

TABLE 10

Flame application to example 1; 12 s horizontal; FAR 25.853 (a) (1) (v)

| Transverse | Burn length in [mm] | Afterflame time in [s] Specimen | Drippings |
| --- | --- | --- | --- |
| 1 | 15 | 0 | 0 |
| 2 | 20 | 3 | 0 |
| 3 | 20 | 2 | 0 |
| 4 | 20 | 4 | 0 |
| 5 | 15 | 1 | 0 |
| Average | 18 | 2 | 0 |
| Limiting value | 152 | 15 | 3 | b) Smoke Density Measurements

Method as in comparative example 1, results in table 11

TABLE 11

Smoke density test with flame application to example 1; FAR 25.853 (c)

| Specimen | Optical density at time t in [min] | | | | | | | Ds max within 4 min |
| --- | --- | --- | --- | --- | --- | --- | --- | --- |
| | 1 | 1.5 | 2 | 3 | 4 | 5 | 6 | |
| 1 | 8 | 28 | 55 | 75 | 82 | 87 | 92 | 82 |
| 2 | 13 | 33 | 46 | 65 | 92 | 105 | 113 | 92 |
| 3 | 5 | 36 | 59 | 75 | 84 | 87 | 92 | 84 |
| 4 | 4 | 17 | 29 | 47 | 62 | 75 | 87 | 62 |
| Average | 8 | 29 | 47 | 66 | 80 | 89 | 96 | 80 |
| Limiting value to FAR 25.853 (c) | | | | | | | | 200 | c) Smoke Analysis

Method as in comparative example 1, results in table 12

TABLE 12

Smoke analysis from example 1; AITM 3.0005

| Gas component | Limiting value in [ppm] after 4 min | Detected in [ppm] after 4 min |
| --- | --- | --- |
| HCN | 150 | 0.5 |
| CO | 3 500 | 200 |
| $NO + NO_2$ | 100 | 0.5 |
| $SO_2 + H_2S$ | 100 | 0.0 |
| HF | 100 | ./. |
| HCl | 150 | ./. |

./. not determined

EXAMPLE 2

A commercially available, flame-retardant, gray-colored polycarbonate (e.g. MAKROLON®) with one smooth and one structured side was used (thickness of material: 2.0 mm), the structured side of which had been laminated to a non-flame-retardant polycarbonate film (thickness: 90 μm). The flame-retardant polycarbonate had an LOI value of 32–35 to ASTM D 2863, and the non-flame-retardant polycarbonate had an LOI value of 26 to ASTM D 2863.

a) Flame Application Tests

Method as in comparative example 1 (vertical tests only), results in tables 13 and 14

TABLE 13

Flame application to example 2; 60 s vertical; FAR 25.853 (a) (1)

| (i) Longitudinal | Burn length in [mm] | Afterflame time in [s] Specimen | Drippings |
|---|---|---|---|
| 1 | 50 | 7 | 0 |
| 2 | 55 | 2 | 0 |
| 3 | 60 | 9 | 0 |
| 4 | 60 | 7 | 0 |
| 5 | 60 | 1 | 0 |
| Average | 57 | 5 | 0 |
| Limiting value | 152 | 15 | 3 |

TABLE 14

Flame application to example 2; 12 s vertical; FAR 25.853 (a) (1) (ii)

| Longitudinal | Burn length in [mm] | Afterflame time in [s] Specimen | Drippings |
|---|---|---|---|
| 1 | 20 | 2 | 0 |
| 2 | 20 | 1 | 0 |
| 3 | 20 | 1 | 0 |
| 4 | 20 | 2 | 0 |
| 5 | 20 | 0 | 0 |
| Average | 20 | 1 | 0 |
| Limiting value | 203 | 15 | 5 | b) Smoke Density Measurements

Method as in comparative example 1, results in table 15

TABLE 15

Smoke density test with flame application to example 2; FAR 25.853 (c)

| Specimen | Optical density at time t in [min] | | | | | | | Ds max within 4 min |
|---|---|---|---|---|---|---|---|---|
| | 1 | 1.5 | 2 | 3 | 4 | 5 | 6 | |
| 1 | 6 | 26 | 50 | 89 | 109 | 127 | 132 | 109 |
| 2 | 3 | 11 | 26 | 59 | 82 | 98 | 117 | 82 |
| 3 | 5 | 25 | 60 | 102 | 113 | 122 | 127 | 113 |
| 4 | 3 | 14 | 54 | 113 | 167 | 175 | 175 | 167 |
| Average | 4 | 19 | 48 | 91 | 118 | 131 | 138 | 118 |
| Limiting value to FAR 25.853 (c) | | | | | | | | 200 | c) Smoke Analysis

Method as in comparative example 1, results in table 16

TABLE 16

Smoke analysis from example 2; AITM 3.0005

| Gas component | Limiting value in [ppm] after 4 min | Detected in [ppm] after 4 min |
|---|---|---|
| HCN | 150 | 0.5 |
| CO | 3 500 | 200 |
| $NO + NO_2$ | 100 | 0.5 |
| $SO_2 + H_2S$ | 100 | 0.0 |
| HF | 100 | ./. |
| HCl | 150 | ./. |

./. not determined

EXAMPLE 3

A commercially available, flame-retardant, gray-colored polycarbonate (e.g. MAKROLON®) with one smooth and one structured side was used (thickness of material: 1.0 mm), the structured side of which had been laminated to a non-flame-retardant polycarbonate film (thickness: 175 μm). The flame-retardant polycarbonate had an LOI value of 32–35 to ASTM D 2863, and the non-flame-retardant polycarbonate had an LOI value of 26 to ASTM D 2863.

a) Flame Application Tests

Method as in example 2 (vertical tests only), results in tables 17 and 18

TABLE 17

Flame application to example 3; 60 s vertical; FAR 25.853 (a) (1) (i)

| Longitudinal | Burn length in [mm] | Afterflame time in [s] Specimen | Drippings |
|---|---|---|---|
| 1 | 80 | 8 | 0 |
| 2 | 85 | 7 | 0 |
| 3 | 85 | 2 | 0 |
| 4 | 90 | 2 | 0 |
| 5 | 75 | 4 | 0 |
| Average | 83 | 5 | 0 |
| Limiting value | 152 | 15 | 3 |

TABLE 18

Flame application to example 3; 12 s vertical; FAR 25.853 (a) (1)

| (ii) Longitudinal | Burn length in [mm] | Afterflame time in [s] Specimen | Drippings |
|---|---|---|---|
| 1 | 25 | 2 | 0 |
| 2 | 25 | 4 | 0 |
| 3 | 25 | 3 | 0 |
| 4 | 25 | 10 | 0 |
| 5 | 25 | 2 | 0 |
| Average | 25 | 4 | 0 |
| Limiting value | 203 | 15 | 5 | b) Smoke Density Measurements

Method as in comparative example 1, results in table 19

TABLE 19

Smoke density test with flame application to example 3; FAR 25.853 (c)

| Specimen | Optical density at time t in [min] | | | | | | | Ds max within 4 min |
|---|---|---|---|---|---|---|---|---|
| | 1 | 1.5 | 2 | 3 | 4 | 5 | 6 | |
| 1 | 23 | 30 | 34 | 55 | 67 | 77 | 84 | 67 |
| 2 | 16 | 35 | 47 | 65 | 79 | 89 | 98 | 79 |
| 3 | 16 | 26 | 33 | 54 | 59 | 69 | 79 | 59 |
| 4 | 14 | 25 | 40 | 77 | 95 | 109 | 122 | 95 |
| Average | 17 | 29 | 39 | 63 | 75 | 86 | 96 | 75 |
| Limiting value to FAR 25.853 (c) | | | | | | | | 200 | c) Smoke Analysis

Method as in comparative example 1, results in table 20

TABLE 20

Smoke analysis from example 3; AITM 3.0005

| Gas component | Limiting value in [ppm] after 4 min | Detected in [ppm] after 4 min |
|---|---|---|
| HCN | 150 | 0.0 |
| CO | 3 500 | 180 |
| NO + NO$_2$ | 100 | 0.5 |
| SO$_2$ + H$_2$S | 100 | 0.0 |
| HF | 100 | ./. |
| HCl | 150 | ./. |

./. not determined

EXAMPLE 4

A commercially available, flame-retardant, gray-colored polycarbonate (e.g. MAKROLON®) with one smooth and one structured side was used (thickness of material: 2.0 mm), the structured side of which had been laminated to a non-flame-retardant polycarbonate film (thickness: 500 μm). The flame-retardant polycarbonate had an LOI value of 32–35 to ASTM D 2863, and the non-flame-retardant polycarbonate had an LOI value of 26 to ASTM D 2863.

a) Flame Application Tests

Method as in example 2 (vertical tests only), results in tables 21 and 22

TABLE 21

Flame application to example 4; 60 s vertical; FAR 25.853 (a) (1)

| (i) Longitudinal | Burn length in [mm] | Afterflame time in [s] | |
|---|---|---|---|
| | | Specimen | Drippings |
| 1 | 50 | 0 | 0 |
| 2 | 45 | 1 | 0 |
| 3 | 50 | 1 | 0 |
| 4 | 45 | 1 | 0 |
| 5 | 45 | 5 | 0 |
| Average | 47 | 2 | 0 |
| Limiting value | 152 | 15 | 3 |

TABLE 22

Flame application to example 4; 12 s vertical; FAR 25.853 (a) (1) (ii)

| Longitudinal | Burn length in [mm] | Afterflame time in [s] | |
|---|---|---|---|
| | | Specimen | Drippings |
| 1 | 10 | 1 | 0 |
| 2 | 10 | 3 | 0 |
| 3 | 10 | 2 | 0 |
| 4 | 10 | 4 | 0 |
| 5 | 10 | 2 | 0 |
| Average | 10 | 2 | 0 |
| Limiting value | 203 | 15 | 5 | b) Smoke Density Measurements

Method as in comparative example 1, results in table 23

TABLE 23

Smoke density test with flame application to example 4; FAR 25.853 (c)

| Specimen | Optical density at time t in [min] | | | | | | | Ds max within 4 min |
|---|---|---|---|---|---|---|---|---|
| | 1 | 1.5 | 2 | 3 | 4 | 5 | 6 | |
| 1 | 13 | 30 | 50 | 84 | 138 | 147 | 143 | 138 |
| 2 | 9 | 23 | 35 | 53 | 67 | 75 | 84 | 67 |
| 3 | 11 | 31 | 43 | 75 | 122 | 141 | 157 | 122 |
| 4 | 14 | 29 | 42 | 71 | 98 | 109 | 113 | 98 |
| Average | 12 | 28 | 43 | 71 | 106 | 118 | 124 | 106 |
| Limiting value to FAR 25.853 (c) | | | | | | | | 200 | c) Smoke Analysis

Method as in comparative example 1, results in table 24

TABLE 24

Smoke analysis from example 4; AITM 3.0005

| Gas component | Limiting value in [ppm] after 4 min | Detected in [ppm] after 4 min |
|---|---|---|
| HCN | 150 | 0.0 |
| CO | 3 500 | 100 |
| NO + NO$_2$ | 100 | 1.5 |
| SO$_2$ + H$_2$S | 100 | 0.0 |
| HF | 100 | ./. |
| HCl | 150 | ./. |

./. not determined

What is claimed is:

1. A thermoplastically moldable composite polycarbonate material comprising at least two layers, wherein at least one layer as an LOI value smaller than 29 and at least one layer as an LOI value greater than 29.

2. The thermoplastically moldable composite polycarbonate material as claimed in claim 1, wherein the at least one layer with an LOI value greater than 29 is obtained from a mixture composed of
   a) from 40 to 100% by weight, based on the total weight of the mixture, of at least one polycarbonate
   b) from 0 to 40% by weight, based on the total weight of the mixture, of at least one polymer from the group consisting of poly(meth)acrylates, polyesters, polyamides, polyimides, polyurethanes, polyethers, ABS, ASA, and PBT
   c) from 0 to 10% by weight, based on the total weight of the mixture, of at least one flame retardant and/or flame-retarding additive d) from 0 to 10% by weight, based on the total weight of the mixture, of at least one additive from the group consisting of antistats, antioxidants, dyes, fillers, light stabilizers, pigments, UV absorbers, agents providing weathering protection, and plasticizers, where the entirety of a), b), c), and d) gives 100% by weight.

3. The thermoplastically moldable composite polycarbonate material as claimed in claim 1, wherein the at least one layer with an LOI value smaller than 29 is obtained from a mixture composed of e) from 40 to 100% by weight, based on the total weight of the mixture, of at least one polycarbonate
f) from 0 to 40% by weight, based on the total weight of the mixture, of at least one polymer from the group consisting of poly(meth)acrylates, polyesters, polyamides, polyimides, polyurethanes, polyethers, ABS, ASA, and PBT
g) from 0 to 10% by weight, based on the total weight of the mixture, of at least one additive from the group consisting of antistats, antioxidants, dyes, fillers, light stabilizers, pigments, UV absorbers, agents providing weathering protection, and plasticizers, where the entirety of e), f), and g) gives 100% by weight.

4. The thermoplastically moldable composite polycarbonate material as claimed claim 1, wherein it is composed of 2, 3, 4, or 5 layers.

5. The thermoplastically moldable composite polycarbonate material as claimed in claim 1, wherein the ratio of the thickness of the at least one layer with an LOI value smaller than 29 and the thickness of the at least one layer with an LOI value greater than 29 is in the range from 0.01 and 0.5.

6. The thermoplastically moldable composite polycarbonate material as claimed in claim 1, wherein the ratio of the weight of the at least one layer with an LOI value smaller than 29 and the weight of the at least one layer with an LOI value greater than 29 is in the range from 0.01 to 0.5.

7. The thermoplastically moldable composite polycarbonate material as claimed in claim 1, wherein the at least one polycarbonate layer with an LOI value smaller than 29 has a thickness of from 30 µm to 500 µm.

8. The thermoplastically moldable composite polycarbonate material as claimed in claim 1, wherein the at least one polycarbonate layer with an LOI value greater than 29 has a thickness of from 0.7 mm to 3 mm.

9. The thermoplastically moldable composite polycarbonate material as claimed in claim 1, wherein a polycarbonate layer with an LOI value smaller than 29 is an outer layer of the composite polycarbonate material.

10. The thermoplastically moldable composite polycarbonate material as claimed in claim 1, wherein, between a layer with LOI value greater than 29 and a layer with an LOI value smaller than 29, it has a third layer, the third layer being a decorative layer.

11. The thermoplastically moldable composite polycarbonate material as claimed in claim 1, wherein when it is subject to vertical flame application to an edge for 60 seconds in accordance with FAR 25.853 (a) (1) (i) it has a burn length smaller than 150 mm, and the afterflame time is shorter than 15 seconds, and the flame time of drippings is smaller than 3 seconds.

12. The thermoplastically moldable composite polycarbonate material as claimed in claim 1, wherein the specific optical density in accordance with FAR 25.853 (c) and AITM 2.0007 does not exceed $Ds_{max}=200$ during a test period of four minutes.

13. A process for producing a thermoplastically moldable composite polycarbonate material as claimed in claim 1, wherein a) at least one dry mix with an LOI value smaller than 29 and at least one dry mix with an LOI value greater than 29 are extruded, and
b) the resultant films and, where appropriate, other films are laminated to one another to obtain the thermoplastically moldable composite material.

14. A process for producing a thermoplastically moldable composite polycarbonate material as claimed in claim 1, wherein a) the surface of at least one film with an LOI value smaller than 29 is provided with an optical effect, and then
b) the film provided with the optical effect and with an LOI value smaller than 29 is laminated to a film with an LOI value greater than 29 in such a way that the resulting thermoplastically moldable composite polycarbonate material has at least one decorative layer between a layer with an LOI value smaller than 29 and a layer with an LOI value greater than 29.

15. A flame-retardant polycarbonate molding obtainable by a process in which a thermoplastically moldable composite polycarbonate material as claimed claim 1 is thermoplastically molded.

16. An aircraft construction part obtained from the flame-retardant polycarbonate molding as claimed in claim 15.

17. The thermoplastically moldable composite polycarbonate material as claimed in claim 1, wherein at least one layer has LOI value smaller than 28.

18. The thermoplastically moldable composite polycarbonate material as claimed in claim 1, wherein at least one layer has LOI value smaller than 27.

19. The thermoplastically moldable composite polycarbonate material as claimed in claim 1, wherein at least one layer has LOI value greater than 30.

20. The thermoplastically moldable composite polycarbonate material as claimed in claim 1, wherein at least one layer has LOI value greater than 31.

* * * * *